(12) United States Patent
Ichikawa et al.

(10) Patent No.: US 12,058,792 B2
(45) Date of Patent: Aug. 6, 2024

(54) VEHICLE LAMP

(71) Applicant: KOITO MANUFACTURING CO., LTD., Tokyo (JP)

(72) Inventors: Tomoyuki Ichikawa, Shizuoka (JP); Tetsuya Suzuki, Shizuoka (JP); Atsushi Ozawa, Shizuoka (JP); Toru Ito, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 406 days.

(21) Appl. No.: 17/471,289

(22) Filed: Sep. 10, 2021

(65) Prior Publication Data

US 2021/0410248 A1    Dec. 30, 2021

Related U.S. Application Data

(63) Continuation of application No. PCT/JP2020/010361, filed on Mar. 10, 2020.

(30) Foreign Application Priority Data

Mar. 11, 2019 (JP) ................................. 2019-043568
Feb. 26, 2020 (JP) ................................. 2020-030765
Mar. 10, 2020 (JP) ................................. 2020-040725

(51) Int. Cl.
*H05B 45/30* (2020.01)
*H05B 45/345* (2020.01)
*F21Y 115/10* (2016.01)

(52) U.S. Cl.
CPC ........ *H05B 45/345* (2020.01); *F21Y 2115/10* (2016.08)

(58) Field of Classification Search
CPC ...... H05B 45/10; H05B 45/30; H05B 45/345; H05B 47/10; F21Y 2115/10
See application file for complete search history.

(56) References Cited

U.S. PATENT DOCUMENTS

2004/0070987 A1    4/2004  Iwaki et al.
2011/0002069 A1*   1/2011  Yamano ................. H05B 45/10
                                                     361/18
2012/0019170 A1    1/2012  Matsui
(Continued)

FOREIGN PATENT DOCUMENTS

JP    2004-063084 A    2/2004
JP    2004-122912 A    4/2004
(Continued)

OTHER PUBLICATIONS

Office Action (Communication pursuant to Article 94(3) EPC) issued on Jul. 26, 2023, in corresponding European Patent Application No. 20770738.1. (7 pages).
(Continued)

*Primary Examiner* — Jimmy T Vu
(74) *Attorney, Agent, or Firm* — BUCHANAN INGERSOLL & ROONEY PC

(57) ABSTRACT

A semiconductor light source and a constant current circuit are arranged in series between an input terminal and a ground terminal. When an input voltage at the input terminal exceeds a predetermined threshold voltage, a load dump circuit cuts off or reduces a current that flows through the constant current circuit.

14 Claims, 12 Drawing Sheets

(56) References Cited

U.S. PATENT DOCUMENTS

2015/0312987 A1* 10/2015 Gibbs ................ H05B 45/345
                                                           315/122
2017/0079103 A1    3/2017 Niles et al.

FOREIGN PATENT DOCUMENTS

| JP | 2012-028167 A |   | 2/2012  |
|----|---------------|---|---------|
| JP | 2014-241202 A |   | 12/2014 |
| JP | 2016-197711 A |   | 11/2016 |
| JP |  2016197711 A | * | 11/2016 |

OTHER PUBLICATIONS

Office Action (Notification of Reason(s) for Refusal) issued on Jun. 20, 2023, in corresponding Japanese Patent Application No. 2021-505089 and English translation of the Office Action. (5 pages).

Extended European Search Report dated Mar. 23, 2022, issued in European Patent Application No. 20770738.1, 10 pages.

International Search Report (Form PCT/ISA/210) issued on Jun. 2, 2020, in corresponding International Application No. PCT/JP2020/010361. (4 pages).

International Preliminary Report on Patentability (Form PCT/IB/373) and the Written Opinion of the International Searching Authority (Form PCT/ISA/237) issued on Aug. 25, 2021, in corresponding International Application No. PCT/JP2020/010361. (13 pages).

\* cited by examiner

VEHICLE LAMP

BACKGROUND

1. Technical Field

The present disclosure relates to a lamp to be used for an automobile or the like.

2. Description of the Related Art

As conventional light sources used for automotive lamps, thus far, electric bulbs have been employed. In recent years, however, semiconductor light sources such as light-emitting diodes (LEDs) or the like are coming to be widely employed. In particular, a semiconductor light source that can be replaced by a normal product when a malfunction such as disconnection or the like occurs, as with conventional general-purpose electric bulbs, is referred to as an LED socket.

FIG. 1 is a circuit diagram showing an LED socket. The voltage $V_{BAT}$ (input voltage $V_{IN}$) is supplied to an input terminal IN of an LED socket 100R from a battery 2 via a switch 4 that is turned on when the LED socket 100R is to be turned on. A ground terminal GND of the LED socket 100R is grounded. The LED socket 100R includes a light source 110 and a constant current circuit 120R.

The light source 110 includes multiple (three) LEDs 112 coupled in series. The constant current circuit 120R stabilizes a current $I_{LED}$ that flows through the light source 110 to a predetermined value such that the light source 110 emits light with a constant luminance. The LED socket 100R is required to have a low cost. Accordingly, instead of a switching power supply, a linear current source having a simple circuit configuration is employed as the constant current circuit 120R.

The constant current source 120R includes transistors Q1 and Q2 and resistors R1 and R2. Description will be made with the base-emitter voltage of each of the transistors Q1 and Q2 as $V_{BE}$. The voltage across the resistor R1 is equal to the base-emitter voltage of the transistor Q2. In this case, the current $I_{LED}$ that flows through a main path including the light source 110, the transistor Q1 and the resistor R1 is represented by the following Expression (1). Assuming that $V_{BE}$ and $R_1$ are constant, the current $I_{LED}$ flowing through the light source 110 is constant.

$$I_{LED}=V_{BE}/R1 \quad (1)$$

As a result of investigating the LED socket 100R shown in FIG. 1, the present inventors have recognized the following problem.

The voltage drop across the light source 110 is represented by 3×Vf. Here, Vf represents the forward voltage of the LED 112. The voltage drop $V_{Q1}$ (collector-emitter voltage) across the transistor Q1 is represented by Expression (2).

$$V_{Q1}=V_{IN}-3Vf-V_{BE} \quad (2)$$

The power consumption P of the transistor Q1 is represented by Expression (3). This is 100% power loss, which causes heat generation.

$$P = V_{Q1} \times I_{LED} \quad (3)$$
$$= (V_{IN} \times 3Vf - V_{BE}) \times I_{LED}$$

In Expression 3, Vf, $V_{BE}$, and $I_{LED}$ each represent a constant value. In contrast, the input voltage $V_{IN}$ fluctuates due to variation of the battery voltage. That is to say, with the LED socket 100R shown in FIG. 1, the power consumption of the transistor Q1, i.e., heat generation, becomes large according to an increase of the input voltage $V_{IN}$. When the power consumption of the transistor Q1 exceeds the allowable power loss, this damages the reliability of the transistor Q1. Accordingly, such a conventional arrangement requires countermeasures, i.e., (i) a countermeasure in which a transistor element that supports a large allowable power loss, i.e., a high-cost transistor element having a large chip size, is employed as the transistor Q1, (ii) a countermeasure for releasing heat in which a high-performance heatsink or the like is mounted on the transistor Q1. This leads to a large-size circuit and an increased cost.

SUMMARY

The present disclosure has been made in order to solve such a problem.

An embodiment of the present disclosure relates to an automotive lamp. The automotive lamp includes: an input terminal and a ground terminal; a semiconductor light source and a constant current circuit arranged in series between the input terminal and the ground terminal; and a load dump circuit structured to cut off or reduce a current that flows through the constant current circuit when an input voltage of the input terminal exceeds a predetermined threshold voltage.

With this embodiment, when the voltage across the constant current circuit becomes large due to an increase in the voltage at the input terminal, the current is cut off or reduced. Such an arrangement is capable of suppressing the occurrence of heat generation in the transistors that form the constant current circuit. This allows components having low allowable power loss to be employed. Alternatively, this allows the countermeasure for releasing heat to be provided in a simple manner. Accordingly, this provides the automotive lamp with a compact size and a low cost.

Also, the constant current circuit may include: a first transistor and a limiting resistor arranged in series; and a bias circuit structured to adjust the voltage at a control terminal of the first transistor such that the voltage drop across the limiting resistor approaches a predetermined voltage.

Description will be made with the allowable heat loss of the first transistor as $P_{DIS}$, with the current generated by the constant current circuit as $I_{LED}$, with the forward voltage of the semiconductor light source as $V_{LED}$, and the resistance value of the limiting resistor as Rs. In this case, the threshold voltage $V_{TH}$ of the load dump circuit is determined as follows.

$$V_{TH} \leq V_{LED}+P_{DIS}/I_{LED}+Rs \times I_{LED}$$

Also, the load dump circuit may include: a second transistor arranged between the control terminal of the first transistor and the ground; and a control circuit structured to turn on the second transistor when the input voltage exceeds the threshold voltage.

Also, the control circuit may include: a first Zener diode having one end coupled to the input terminal; a first resistor arranged between the other end of the first Zener diode and a control terminal of the second transistor; and a second resistor arranged between the control terminal of the second transistor and the ground terminal.

Also, the bias circuit may include: a bias transistor having an emitter grounded, a base coupled to a connection node that connects the first transistor and the limiting resistor, and a collector coupled to the control terminal of the first transistor; and a bias resistor arranged between the input terminal and the control terminal of the first transistor.

Also, the bias circuit may include an error amplifier structured to receive a reference voltage and the voltage at a connection node that connects the first transistor and the limiting resistor, and having an output coupled to the control terminal of the first transistor.

Also, the load dump circuit may include: a third transistor arranged in series with the constant current circuit; and a control circuit structured to turn off the third transistor or reduce the degree of the on level thereof when the input voltage exceeds the threshold voltage.

Also, the automotive lamp may further include a second Zener diode arranged between the input terminal and the ground terminal.

Also, the automotive lamp may be configured as an LED socket.

Another embodiment of the present disclosure relates to a lighting circuit. The lighting circuit includes: an input terminal and a ground terminal; a constant current circuit arranged in series with a semiconductor light source to be driven between the input terminal and the ground terminal; and a load dump circuit structured to cut off or reduce a current that flows through the constant current circuit when an input voltage of the input terminal exceeds a predetermined threshold voltage.

Also, the constant current circuit may include: a first transistor and a limiting resistor arranged in series; and a bias circuit structured to adjust the voltage at a control terminal of the first transistor such that the voltage drop across the limiting resistor approaches a predetermined voltage. Also, the load dump circuit may include: a second transistor arranged between the control terminal of the first transistor and the ground; and a control circuit structured to turn on the second transistor when the input voltage exceeds the threshold voltage.

Also, the load dump circuit may include: a third transistor arranged in series with the constant current circuit; and a control circuit structured to turn off the third transistor or reduce the degree of the on level thereof when the input voltage exceeds the threshold voltage.

Yet another embodiment of the present disclosure relates to a lighting circuit structured to drive multiple light-emitting elements coupled in series. The lighting circuit includes: a first constant current circuit arranged in series with the multiple light-emitting elements between an input terminal and a ground terminal; a second constant current circuit arranged in series with a part of the multiple light-emitting elements between the input terminal and the ground terminal; and a control circuit structured to: (i) turn off the first constant current circuit and turn on the second constant current circuit when an input voltage of the input terminal is lower than a first threshold value; (ii) enable the first constant current circuit and disable the second constant current circuit when the input voltage is higher than the first threshold value and is lower than the second threshold value; and (iii) disable the first constant current circuit or reduce a current to be generated, and disable the second constant current circuit, when the input voltage is higher than the second threshold value.

Also, the lighting circuit may further include: a first input transistor arranged in series with the multiple light-emitting elements and the first constant current circuit between the input terminal and the ground terminal; and a second input transistor arranged in series with a part of the multiple light-emitting elements and the second constant current circuit between the input terminal and the ground terminal. Also, the first constant current circuit may be controlled to be enabled or disabled according to the on/off state of the first input transistor. Also, the second constant current circuit may be controlled to be enabled or disabled according to the on/off state of the second input transistor.

Also, the first constant current circuit and the second constant current circuit may each be provided with an enable terminal. Also, the first constant current circuit and the second constant current circuit may each be controlled to be enabled or disabled according to the state of the enable terminal thereof.

It should be noted that any combination of the components described above, any component of the present invention, or any manifestation thereof, may be mutually substituted between a method, apparatus, system, and so forth, which are also effective as an embodiment of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 1:
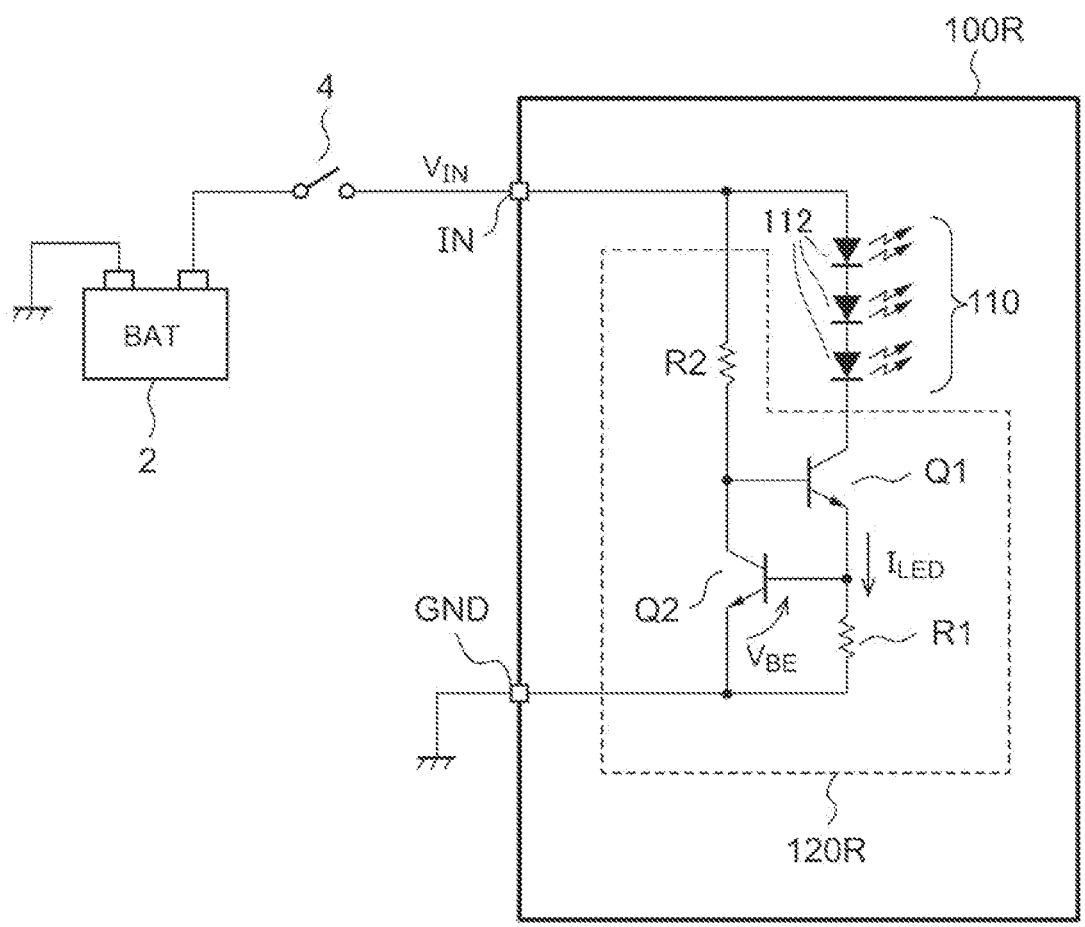
FIG. 1 is a circuit diagram showing an LED socket.

Description will be made below regarding the present invention based on preferred embodiments with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

In the present specification, the state represented by the phrase "the member A is coupled to the member B" includes a state in which the member A is indirectly coupled to the member B via another member that does not substantially affect the electric connection between them, or that does not damage the functions or effects of the connection between them, in addition to a state in which they are physically and directly coupled.

Similarly, the state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions or effects of the connection between them, in addition to a state in which they are directly coupled.

In the present specification, the reference symbols denoting electric signals such as a voltage signal, current signal, or the like, and the reference symbols denoting circuit elements such as a resistor, capacitor, or the like, also represent the corresponding voltage value, current value, resistance value, or capacitance value as necessary.

Figure 2:
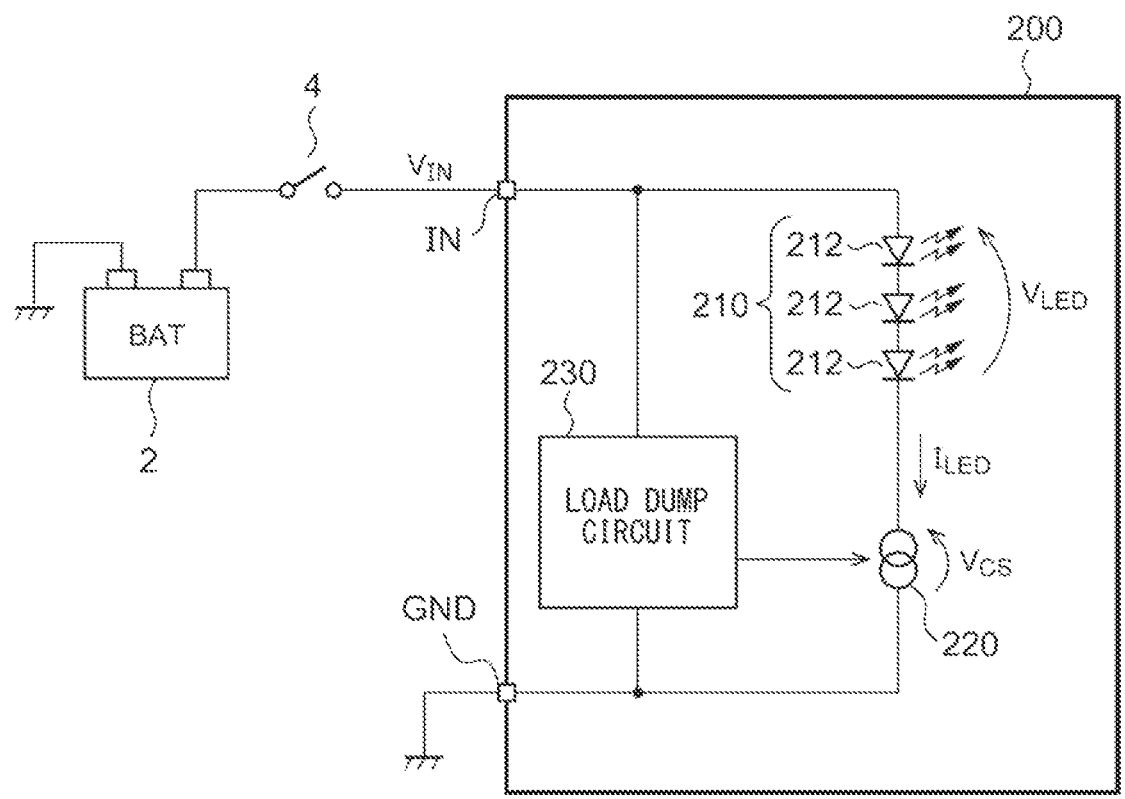
FIG. 2 is a circuit diagram showing an automotive lamp according to an embodiment 1.

FIG. 2 is a circuit diagram showing an automotive lamp 200 according to an embodiment 1. A DC voltage (input voltage) $V_{IN}$ is supplied to the automotive lamp 200 from a battery 2 via a switch 4.

The automotive lamp 200 includes a semiconductor light source 210, a constant current circuit 220, and a load dump circuit 230. A portion (the constant current circuit 220 and the load dump circuit 230) of the automotive lamp 200 excluding the semiconductor light source 210 will also be referred to as a "lighting circuit". The semiconductor light source 210 includes a plurality of N (N≥2) light-emitting elements 212 coupled in series. FIG. 2 shows an example in which n=3. As the light-emitting element 212, an LED is preferably employed. However, the present invention is not restricted to such an arrangement. Also, laser diodes (LDs), organic EL elements, or the like, may be employed.

As a preferable embodiment of the automotive lamp 200, an LED socket has a structure in which the semiconductor light source 210, the constant current circuit 220, and the load dump circuit 230 are housed in a single package. The automotive lamp 200 has a structure that allows it to be detachably mounted on an unshown lamp body. It is needless to say that such an LED socket is required to have a long operating life. In addition, the LED socket, which is used as a consumable, is strongly required to have a low cost.

The semiconductor light source 210 and the constant current circuit 220 are arranged in series between the input terminal IN and the ground terminal GND. The constant current circuit 220 stabilizes the current $I_{LED}$ that flows through the semiconductor light source 210 to a predetermined target amount $I_{REF}$ such that the semiconductor light source 210 emits light at a constant luminance.

When the input voltage $V_{IN}$ at the input terminal IN exceeds a predetermined threshold voltage $V_{TH}$, the load dump circuit 230 cuts off the current $I_{LED}$ that flows through the constant current circuit 220, or reduces the current $I_{LED}$ such that it becomes smaller than the target amount $I_{REF}$.

Figure 3:
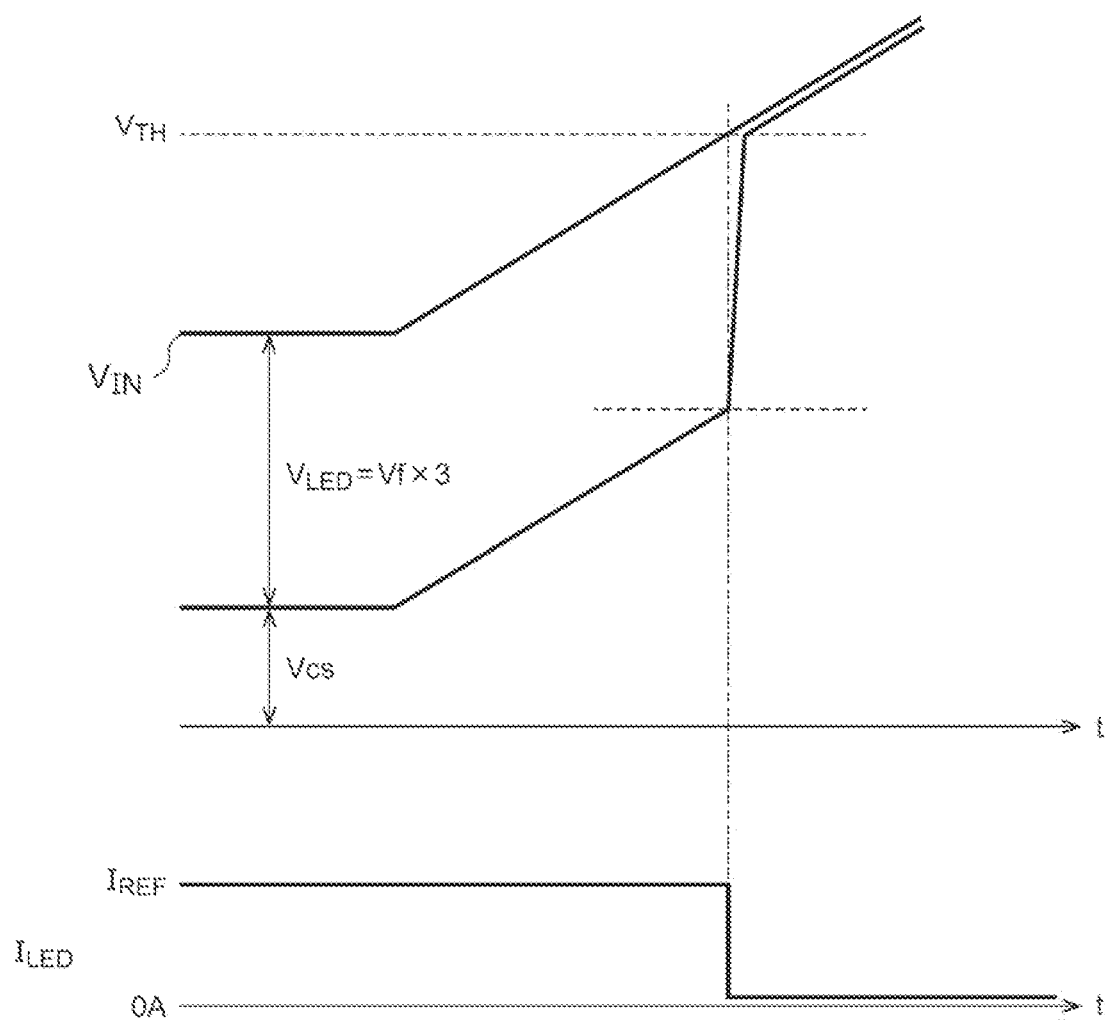
FIG. 3 is a circuit diagram for explaining the operation of the automotive lamp shown in FIG. 2.

The above is the configuration of the automotive lamp 200. Next, description will be made regarding the operation thereof. FIG. 3 is a diagram for explaining the operation of the automotive lamp 200 shown in FIG. 2. $V_{LED}$ represents the voltage drop across the semiconductor light source 210. $V_{cs}$ represents the voltage (voltage drop) across the constant current circuit 220.

When the input voltage $V_{IN}$ is lower than the threshold voltage $V_{TH}$, the driving current $I_{LED}$ stabilized to the predetermined target amount $I_{REF}$ flows through the semiconductor light source 210. In this state, the voltage drop $V_{LED}$ across the semiconductor light source 210 is represented by $V_{LED}=3\times Vf$. The voltage drop $V_{cs}$ across the constant current circuit 220 is represented by $V_{IN}-V_{LED}=V_{IN}-3\times Vf$.

The voltage drop $V_{cs}$ across the constant current circuit 220 increases according to an increase of the input voltage $V_{IN}$. Accordingly, the power consumption of the constant current circuit 220, which is represented by $V_{cs}\times I_{LED}$, also increases.

When the input voltage $V_{IN}$ exceeds the threshold value $V_{TH}$, the load dump circuit 230 cuts off the driving current $I_{LED}$. With this, the voltage drop $V_{LED}$ across the semiconductor light source 210 becomes zero, and the voltage $V_{cs}$ across the constant current circuit 220 increases to the input voltage $V_{IN}$. In this state, the power consumption of the constant current circuit 220 becomes $V_{cs}\times I_{LED}=V_{IN}\times 0=0$ W. Accordingly, heat generation of the constant current circuit 220 is suppressed.

The above is the operation of the automotive lamp 200. With the automotive lamp 200, when the voltage $V_{cs}$ across the constant current circuit 220 becomes large, the driving current $I_{LED}$ is cut off or reduced, thereby suppressing the heat generation of the transistors that form the constant current circuit 220. This allows components having only a small allowable power loss to be employed. Alternatively, this allows the countermeasure for releasing heat to be provided in a simple manner. Accordingly, such an arrangement provides a compact-size and low-cost automotive lamp.

The present disclosure encompasses various kinds of apparatuses and methods that can be regarded as a block configuration or cross-sectional configuration shown in FIG. 2, or otherwise that can be derived from the aforementioned description. That is to say, the present disclosure is not restricted to a specific configuration. More specific description will be made below regarding example configurations or examples for clarification and ease of understanding of the essence of the present disclosure and the operation thereof. That is to say, the following description will by no means be intended to restrict the technical scope of the present invention.

Example 1-1

Figure 4:
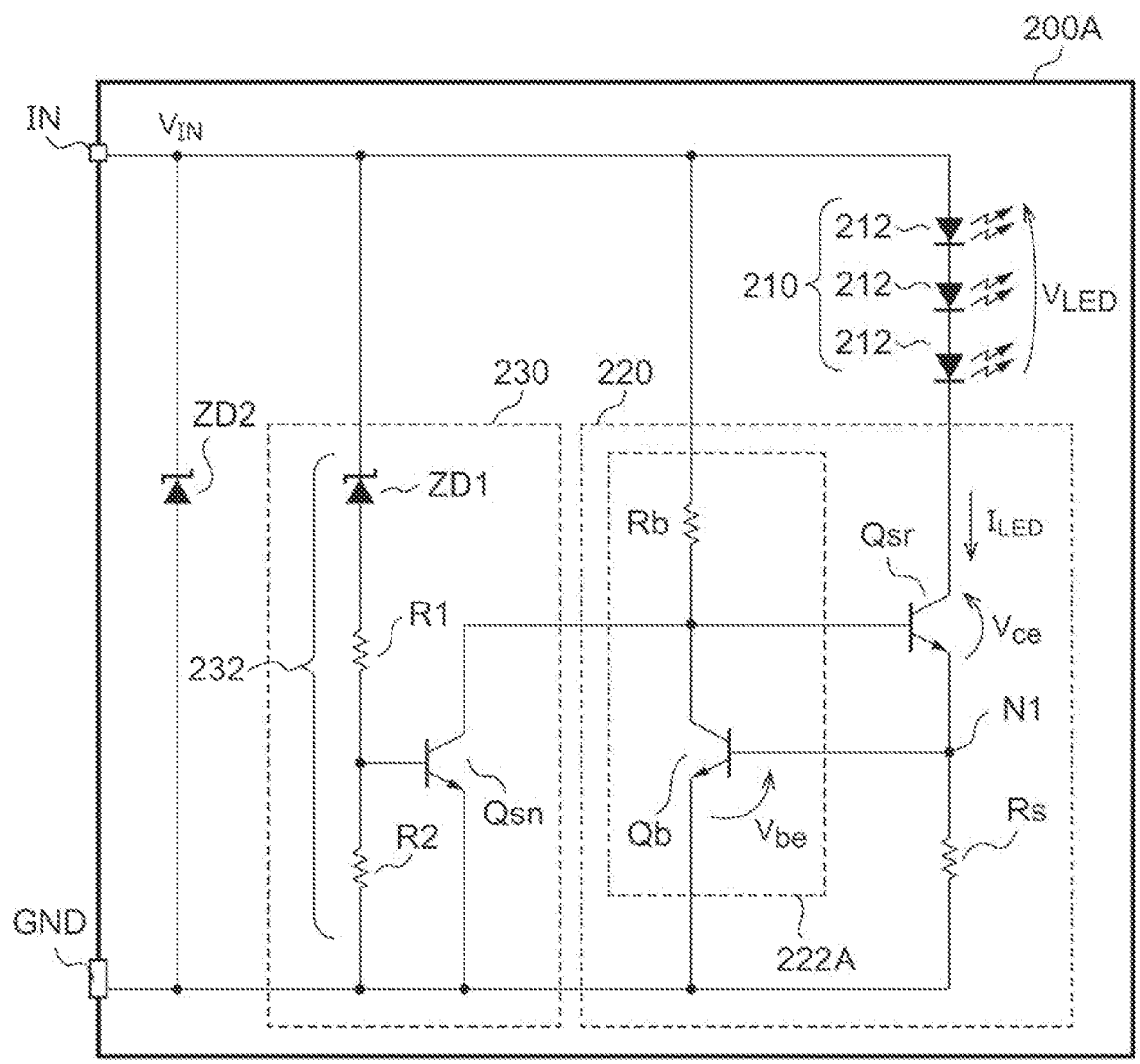
FIG. 4 is a circuit diagram showing an automotive lamp according to an example 1.1.

FIG. 4 is a circuit diagram showing an automotive lamp 200A according to an example 1.1. The constant current circuit 220 includes a series transistor (first transistor) Qsr and a limiting resistor Rs coupled in series. In the present example, the series transistor Qsr is configured as an NPN bipolar transistor. A bias circuit 222A adjusts the voltage at a control terminal (base) of the series transistor Qsr such that the voltage drop Vs across the limiting resistor Rs approaches a predetermined voltage.

The bias circuit 222A includes a bias transistor Qb and a bias resistor Rb. The bias resistor Rb is arranged between the input terminal IN and the base of the series transistor Qsr. The bias transistor Qb is configured as an NPN bipolar transistor. The bias transistor Qb is arranged such that its emitter is grounded, its base is coupled to a connection node N1 that connects the series transistor Qsr and the resistor Rs, and its collector is coupled to the base of the series transistor Qsr.

With the bias circuit 222A, the electric potential of the node N1 is fed back such that it approaches the base-emitter voltage Vbe of the bias transistor Qb. This stabilizes the driving current $I_{LED}$ to the target amount represented by $I_{REF}=V_{be}/Rs$.

The load dump circuit 230 includes a shunt transistor (second transistor) Qsn and a control circuit 232. The shunt transistor Qsn is configured as an NPN bipolar transistor. The shunt transistor Qsn is arranged between the control terminal (base) of the series transistor Qsr and the ground. When the input voltage $V_{IN}$ exceeds the threshold voltage $V_{TH}$, the control circuit 232 turns on (sets to a conduction state) the shunt transistor Qsn. When the shunt transistor Qsn is turned on, this reduces the base voltage of the series transistor Qsr, thereby turning off the series transistor Qsr. In this state, the driving current $I_{LED}$ is cut off.

The control circuit 232 includes a first Zener diode ZD1, a first resistor R1, and a second resistor R2. One end (cathode) of the first Zener diode ZD1 is coupled to the input terminal IN. The first resistor R1 is arranged between the other end (anode) of the first Zener diode ZD1 and the control terminal (base) of the shunt transistor Qsn. The second resistor R2 is arranged between the control terminal (base) of the shunt transistor Qsn and the ground terminal GND.

Description will be made with the Zener voltage of the first Zener diode ZD1 as $V_{ZD1}$ and the voltage at the base of the shunt transistor Qsn, i.e., the voltage at the node N2, as $V_{N2}$. The relation $V_{N2}=(V_{IN}-V_{ZD1})\times R2/(R1+R2)$ holds true. The condition for the shunt transistor Qsn to turn on is represented by $V_{N2}>V_{Be}$. Accordingly, when the relation $V_{IN}>V_{be}\times(R1+R2)/R2+V_{ZD1}$ holds true, the shunt transistor Qsn turns on. That is to say, the right side of the above-described Expression represents the threshold voltage $V_{TH}$ of the load dump circuit 230.

$$V_{TH}=V_{be}\times(R1+R2)/R2+V_{ZD1}$$

The automotive lamp 200A further includes a second Zener diode ZD2 arranged between the input terminal IN and the ground terminal GND.

Figure 5:
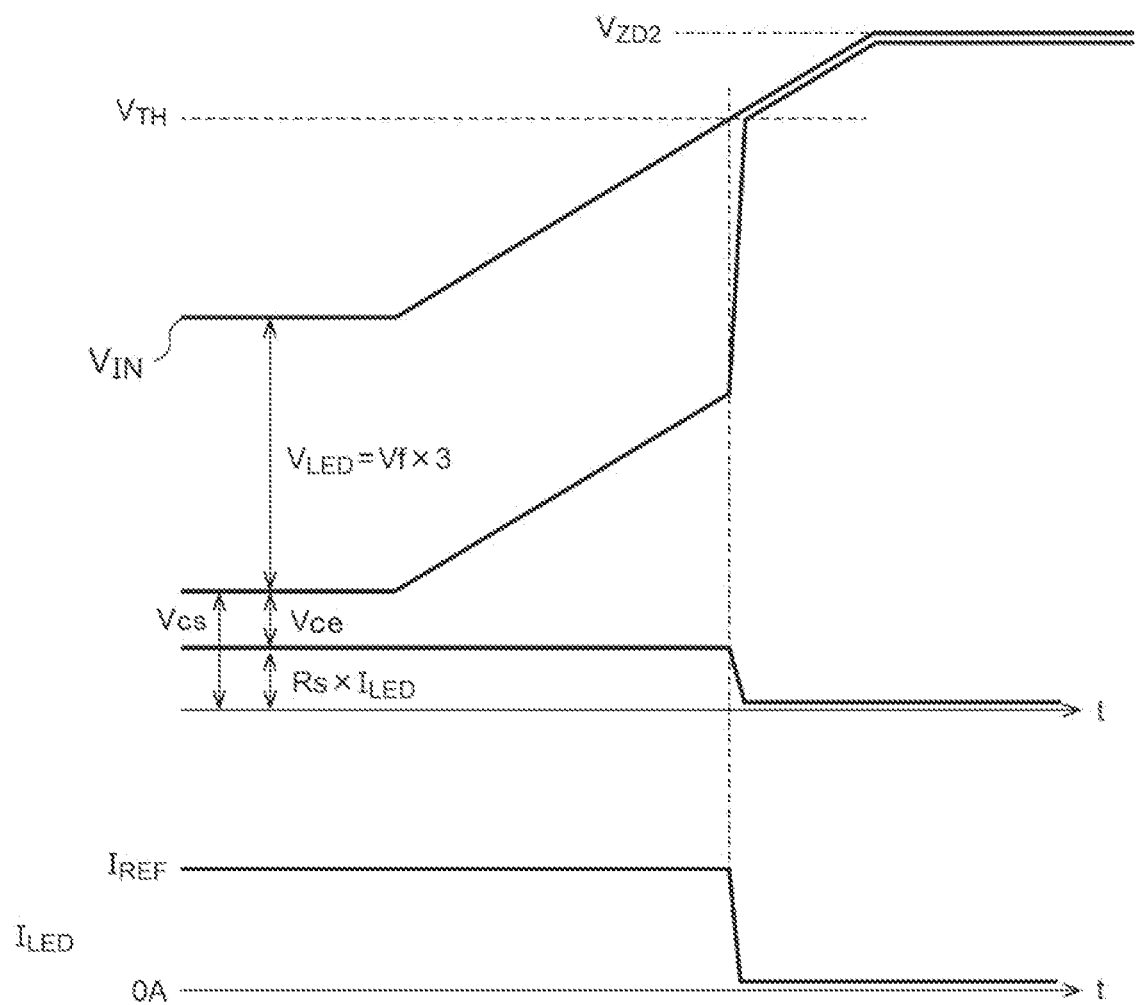
FIG. 5 is a diagram for explaining the operation of the automotive lamp shown in FIG. 4.

The above is the configuration of the automotive lamp 200A. Next, description will be made regarding the operation thereof. FIG. 5 is a diagram for explaining the operation of the automotive lamp 200A shown in FIG. 4. Here, $V_{LED}$ represents the voltage drop across the semiconductor light source 210. Vce represents the voltage (collector-emitter voltage) across the series transistor Qsr. ($Rs\times I_{LED}$) represents the voltage drop across the limiting resistor Rs.

When the input voltage $V_{IN}$ is lower than the threshold voltage $V_{TH}$, the driving current $I_{LED}$ stabilized to the predetermined target amount $I_{REF}$ flows through the semiconductor light source 210. In this state, the voltage drop $V_{LED}$ across the semiconductor light source 210 is represented by ($3\times Vf$). The collector-emitter voltage Vce of the series transistor Qsr is represented by ($V_{IN}-V_{LED}-Rs\times I_{LED}$).

The collector-emitter voltage Vce of the series transistor Qsr increases according to an increase of the input voltage $V_{IN}$. Accordingly, the power consumption of the series transistor Qsr, which is represented by ($Vce\times I_{LED}$), also increases.

When the input voltage $V_{IN}$ exceeds the threshold value $V_{TH}$, the load dump circuit 230 cuts off the driving current $I_{LED}$. With this, the voltage drop $V_{LED}$ across the semiconductor light source 210 and the voltage drop across the limiting resistor Rs become zero, thereby increasing the voltage Vce across the series transistor Qsr to the input voltage $V_{IN}$. In this state, the power consumption of the series transistor Qsr becomes $Vce\times I_{LED}=V_{IN}\times 0=0$ W, thereby suppressing heat generation.

When the input voltage $V_{IN}$ further increases, the input voltage $V_{IN}$ is clamped by the second Zener diode ZD2. This arrangement is capable of preventing the collector-emitter voltage Vce of the series transistor Qsr from exceeding the withstand voltage thereof.

The above is the operation of the automotive lamp 200A. With the automotive lamp 200A, when the voltage $V_{cs}$ (=$Vce+Rs\times I_{LED}$) across the constant current circuit 220 becomes large, the driving current $I_{LED}$ is cut off or reduced before it exceeds the allowable power loss thereof, thereby suppressing the heat generation of the series transistor Qsr. This allows components having only a small allowable power loss to be employed. Alternatively, this allows the countermeasure for releasing heat to be provided in a simple manner. Accordingly, such an arrangement provides a compact-size and low-cost automotive lamp.

With the allowable power loss of the series transistor Qsr as $P_{DIS}$, the threshold voltage $V_{TH}$ may preferably be determined in the range described below.

$$V_{TH} \le V_{LED}+P_{DIS}/I_{LED}+Rs\times I_{LED}$$

Figure 6:
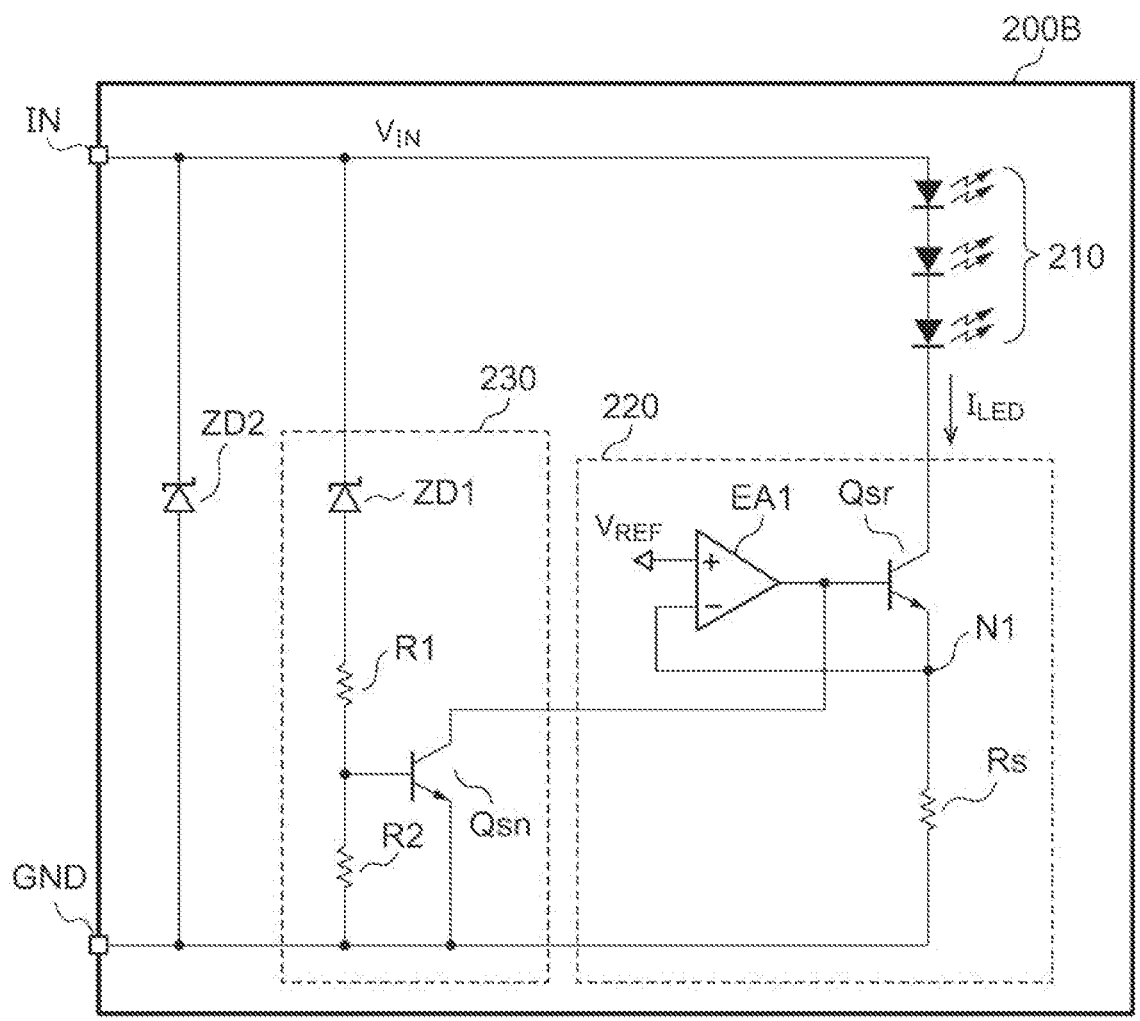
FIG. 6 is a circuit diagram showing an automotive lamp according to an example 1.2.

FIG. 6 is a circuit diagram showing an automotive lamp 200B according to an example 1.2. In contrast to the operations shown in FIG. 6 and FIG. 4, there is a difference in the configuration of the constant current circuit 220. Specifically, the bias circuit 222 shown in FIG. 6 includes an error amplifier EA1. The error amplifier EA1 is arranged such that it receives the voltage ($Rs\times I_{LED}$) at the connection node N1 that connects the series transistor Qsr and the limiting resistor Rs and the reference voltage $V_{REF}$, and such that its output is coupled to the control terminal (base) of the series transistor Qsr. With this configuration, the target value $I_{REF}$ of the driving current $I_{LED}$ is represented by the following Expression.

$$I_{REF}=V_{REF}/Rs$$

Embodiment 2

Figure 7:
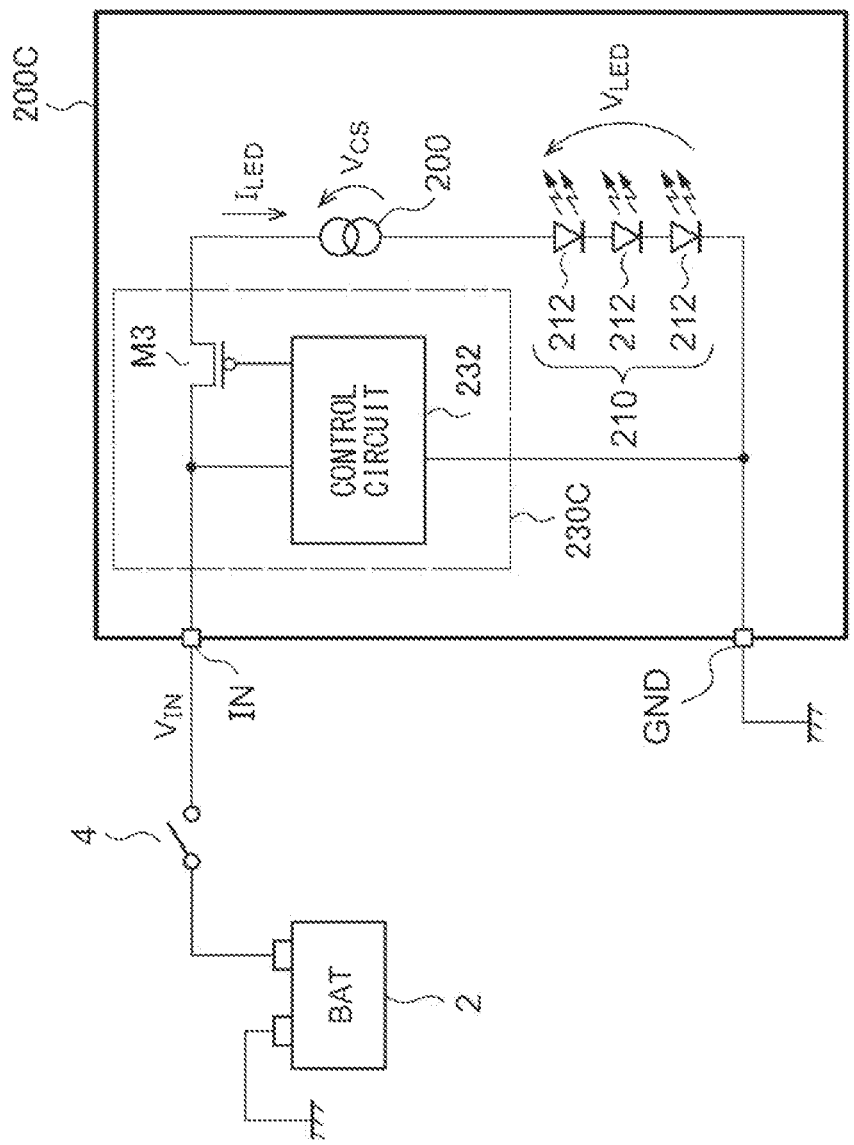
FIG. 7 is a circuit diagram showing an automotive lamp according to an embodiment 2.

FIG. 7 is a circuit diagram showing an automotive lamp 200C according to an embodiment 2. A load dump circuit 230C includes an input transistor (third transistor) M3 and a control circuit 232. The input transistor M3 is arranged in series with the constant current circuit 220. When the input voltage $V_{IN}$ exceeds the threshold voltage $V_{TH}$, the control circuit 232 turns off the third transistor M3 or reduces the on level of the third transistor M3.

This arrangement also provides the same effects as those provided by the embodiment 1.

Figure 8:
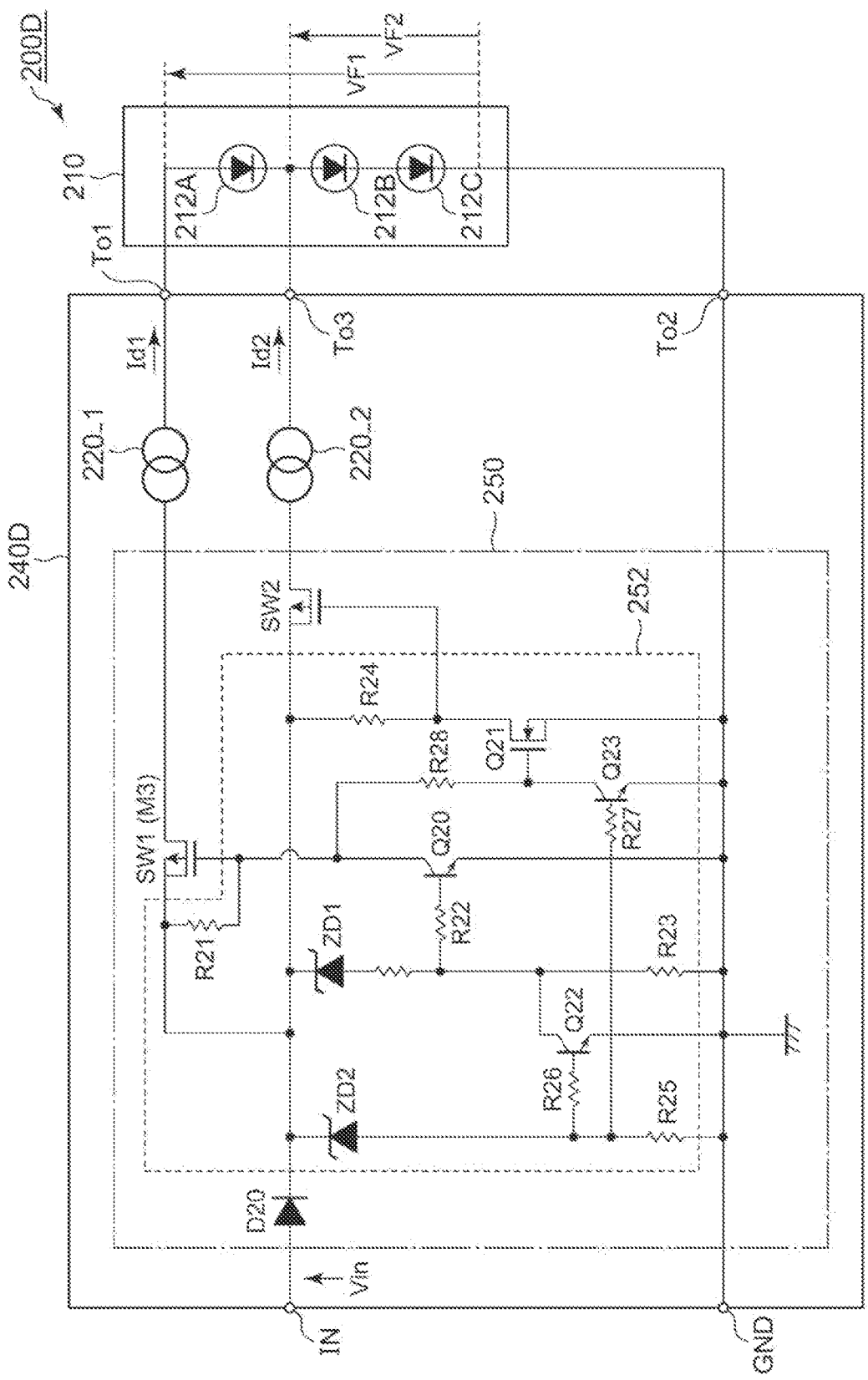
FIG. 8 is a circuit diagram showing an automotive lamp according to an example 2.1.

FIG. 8 is a circuit diagram showing an automotive lamp 200D according to an example 2.1. A lighting circuit 240D includes a first constant current circuit 220_1, a second constant current circuit 220_2, a switching circuit 250, and a reverse-connection protection diode D20.

The semiconductor light source 210 includes multiple LEDs 212A through 212C coupled in series. In this example, three LEDs are arranged. Also, two or three or more LEDs may be arranged. The first constant current circuit 220_1 supplies a driving current Id1 to all the components (i.e., all three LEDs 212A through 212C) of the semiconductor light source 210. The second constant current circuit 220_2 supplies a driving current Id2 to part (two LEDs 212B and 212C in this example) of the semiconductor light source 210. The number of the semiconductor light sources 210 through which the driving current Id2 flows may be one or three or more.

The switching circuit 250 includes a first input transistor SW1, a second input transistor SW2, and a control circuit 252. When the input voltage $V_{IN}$ is in a state in which the three LEDs 212A through 212C can be driven ($V_{IN}>V_{TH1}$), the control circuit 252 sets the first input transistor SW1 to the on state, and sets the second input transistor SW2 to the off state. The first threshold voltage $V_{TH1}$ is determined such that the relation $V_{TH1}>3\times Vf+Vf$ holds true. When $V_{IN}>V_{TH1}$, the first constant current circuit 220_1 it enabled (on), and accordingly, the driving current Id1 is supplied to the three LEDs 212A through 212C.

When the input voltage $V_{IN}$ decreases and becomes lower than the first threshold value $V_{TH1}$, the control circuit 252 turns off the first input transistor SW1 and turns on the second input transistor SW2. In this state, the second constant current circuit 220_2 is enabled (turned on), thereby supplying the driving current Id2 to the two LEDs 212B and 212C.

With the configuration shown in FIG. 8, in a case in which the first input transistor SW1 is continuously turned on when the input voltage $V_{IN}$ becomes excessively high, the power consumption of the lighting circuit 240D is represented by $(V_{IN}-v_{F1})\times \text{Id1}$, and accordingly, heat generation that occurs in the lighting circuit 240D becomes large. In this example, the first input transistor SW1 also provides the function of the input transistor M3 shown in FIG. 7. That is to say, when the input voltage $V_{IN}$ exceeds the threshold value (second threshold value $V_{TH2}$, $V_{TH}2>V_{TH1}$) of the load dump circuit, the control circuit 252 turns off the first input transistor SW1 or reduces the on level of the first input transistor SW1.

The control circuit 252 includes Zener diodes ZD1 and ZD2, transistors Q20 through Q23, and resistors R21 through R26.

The input voltage $V_{IN}$ is compared with the threshold voltage $V_{TH1}$ by means of the circuit elements ZD1, R22, R23, Q20, and R21, which are circuit elements of the control circuit 252. When $V_{IN}<V_{TH1}$, the Zener diode ZD1 is not in a conduction state, the base voltage of the transistor Q20 is set to the low level, and the transistor Q20 is turned off. Furthermore, the gate of the first input transistor SW1 is pulled up by the resistor R21, thereby turning off the first input transistor SW1. In this state, the transistor Q21 is turned on, and accordingly, the gate of the second input transistor SW2 is pulled down, thereby turning on the second input transistor SW2.

When $V_{IN}>V_{TH1}$, the Zener diode ZD1 is set to a conduction state. In this state, a current flows to the base of the transistor Q20, and accordingly, the transistor Q20 turns on, thereby pulling down the gate of the first input transistor SW1. With this, the first input transistor SW1 is turned on. At this time, the transistor Q21 is turned off, and accordingly, the gate of the second input transistor SW2 is pulled up by the resistor R24, thereby turning off the second input transistor SW2.

The input voltage $V_{IN}$ is compared with the threshold voltage $V_{TH2}$ by means of the circuit elements ZD2, R25, R25, and Q22. When $V_{IN}<V_{TH2}$, the Zener diode ZD2 is not set to the conduction state, thereby turning off the transistor Q22. In this step, the same operation as described above is executed.

When $V_{IN}>V_{TH2}$, the Zener diode ZD2 is set to the conduction state, thereby turning on the transistor Q22. This reduces the base current of the transistor Q20, which raises the gate voltage of the first input transistor SW1. This weakens the on level of the first input transistor SW1. Finally, the first input transistor SW1 is turned off.

Such an arrangement is required to prevent the second input transistor SW2 from turning on due to the turn-on of the transistor Q21 when $V_{IN}>V_{TH2}$. For this purpose, the transistor Q23 and the resistor R27 are provided. When $V_{IN}>V_{TH2}$, the transistor Q23 is turned on, thereby maintaining the transistor Q21 at the off level.

Figure 9:
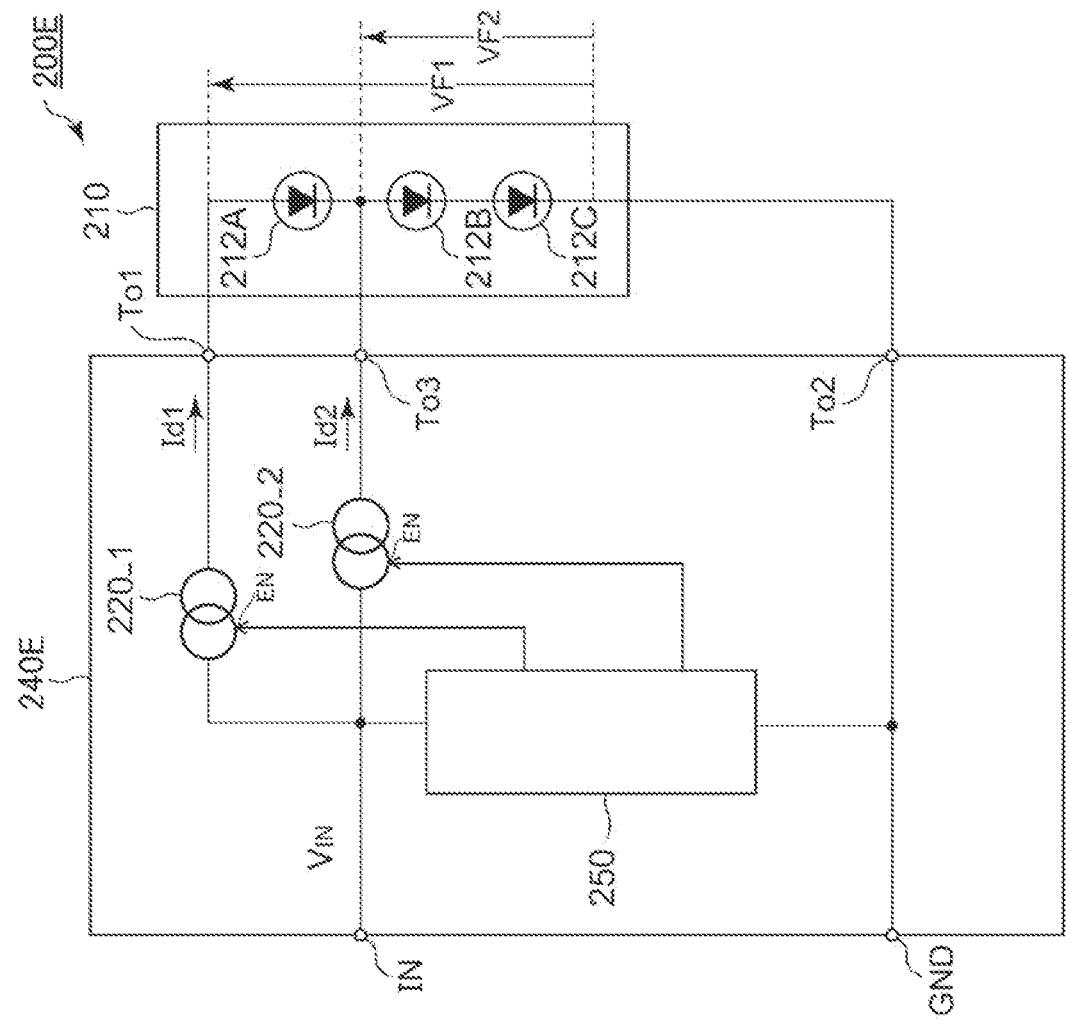
FIG. 9 is a circuit diagram showing an automotive lamp according to an example 2.2.

FIG. 9 is a circuit diagram showing an automotive lamp 200E according to an example 2.2. A first constant current circuit 220_1 and a second constant current circuit 220_2 are each provided with an enable terminal EN. A switching circuit 250 compares the input voltage $V_{IN}$ with threshold voltages $V_{TH1}$ and $V_{TH2}$. The switching circuit 250 controls the state of the enable terminal EN for each of the first constant current circuit 220_1 and the second constant current circuit 220_2 based on the comparison result.

Figure 10:
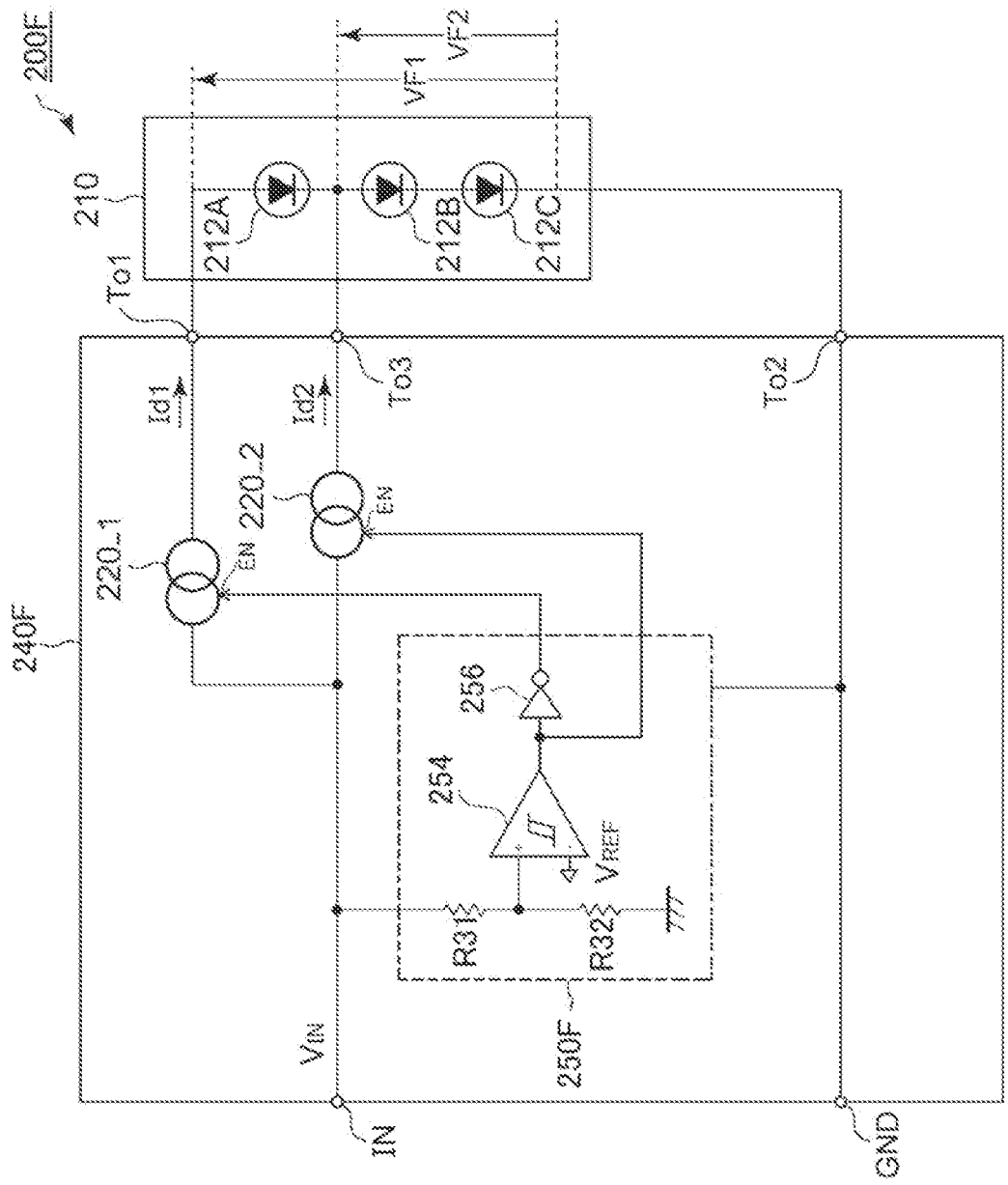
FIG. 10 is a circuit diagram showing an automotive lamp according to an example 2.3.

FIG. 10 is a circuit diagram showing an automotive lamp 200F according to an example 2.3. A switching circuit 250F includes a hysteresis comparator 254, an inverter 256, and a resistor voltage dividing circuit R31/R32. The resistor voltage dividing circuit R31/R32 divides the input voltage $V_{IN}$. The hysteresis comparator 254 compares the input voltage $V_{IN}$ thus divided with a threshold voltage $V_{REF}$. The inverter 256 inverts the output of the hysteresis comparator 254. The two constant current circuits 220_1 and 220_2 operate in a complementary manner according to the output of the hysteresis comparator 254 and the output of the inverter 256.

Figure 11:
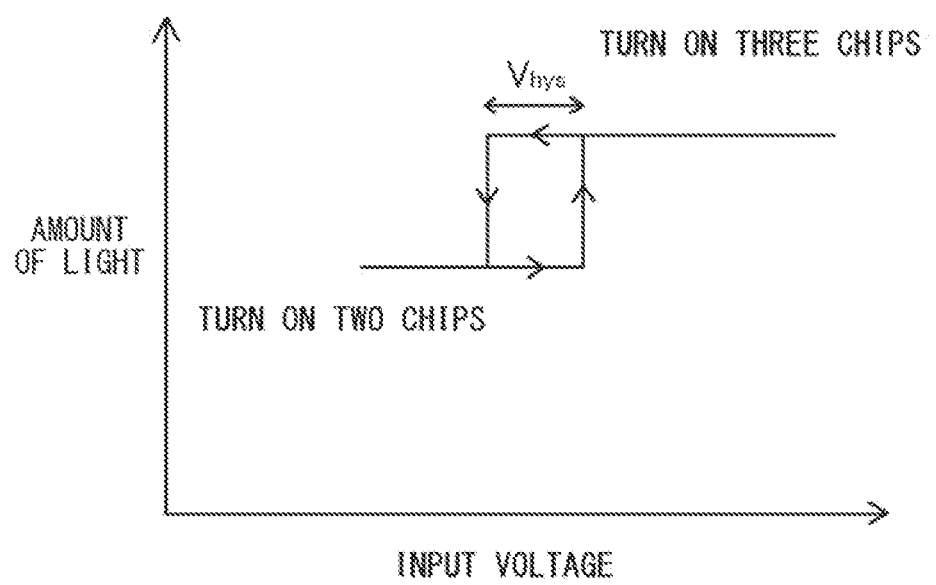
FIG. 11 is a diagram for explaining the operation of the automotive lamp shown in FIG. 10.

FIG. 11 is a diagram for explaining the automotive lamp 200F shown in FIG. 10. In a case in which the variation width of the input voltage $V_{IN}$ is smaller than the hysteresis width $V_{hys}$, the light amount of the LED does not rapidly change, thereby suppressing the occurrence of flicker in the lamp.

Figure 12:
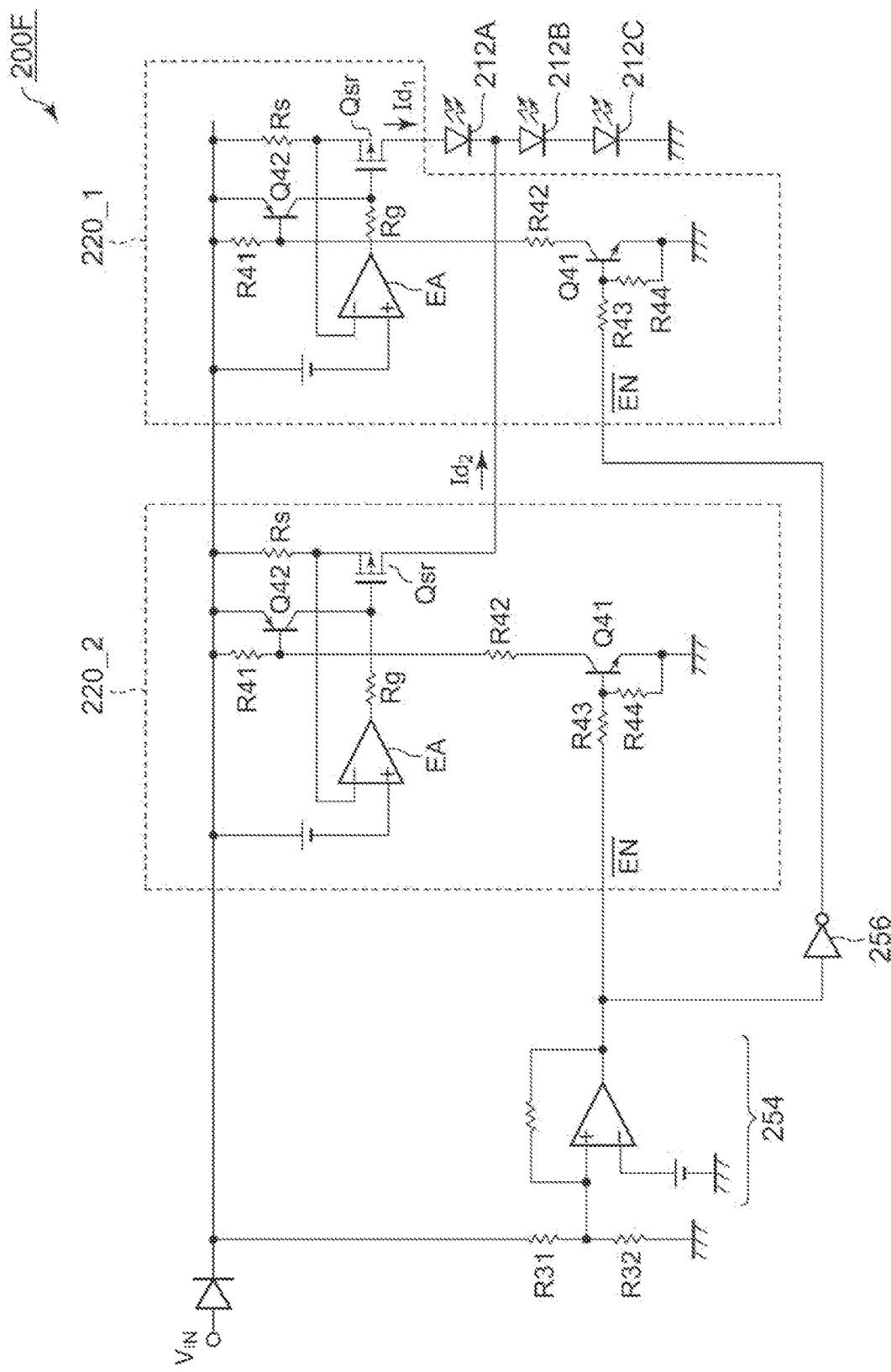
FIG. 12 is a circuit diagram showing a specific circuit configuration of the automotive lamp shown in FIG. 10.

FIG. 12 is a circuit diagram showing a specific circuit configuration of the automotive lamp shown in FIG. 10. The constant current circuits 220_1 and 220_2 each have the same circuit configuration. Specifically, each of the constant current circuits 220 includes a series transistor Qsr, a limiting resistor Rs, a gate resistor Rg, an error amplifier EA, transistors Q41 and Q42, and resistors R41 through R44. The EN pin of the constant current circuit 220 is configured to operate in an active-low manner. The series transistor Qsr, the limiting resistor Rs, and the error amplifier EA are arranged by geometrically reversing the layout of the constant current circuit 220 shown in FIG. 6.

In order to support enable/disable control of the constant current circuits 220, the transistors Q41 and Q42 and the resistors R41 through R44 are provided as additional components. When the high level is input to the enable pin, the transistor Q41 is turned on, and accordingly, the transistor Q42 is turned on. This turns off the transistor Qsr, thereby disabling the constant current circuit 220.

Description has been made above regarding the present disclosure with reference to the embodiments. The above-described embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present disclosure. Description will be made below regarding such modifications.

Modification 1

The control circuit 232 of the load dump circuit 230 may be configured as a voltage comparator.

Modification 2

Description has been made in the embodiment regarding an arrangement in which the shunt transistor Qsn is provided between the base of the series transistor Qsr and the ground. However, the present disclosure is not restricted to such an arrangement. Instead of the shunt transistor Qsn, a transistor (switch) may be inserted in series with the series transistor Qsr. When the input voltage $V_{IN}$ exceeds a threshold voltage $V_{TH}$, the transistor thus inserted may be turned off.

Modification 3

Description has been made in the embodiment regarding an arrangement in which the transistors are each configured as a bipolar transistor. Also, such a transistor may be replaced by a MOSFET (Metal Oxide Semiconductor Field Effect Transistor). In this case, the base, collector, and emitter correspond to the gate, drain, and source, respectively. Also, such an NPN (N-channel) transistor may be replaced by a PNP (P-channel) transistor.

Modification 4

Description has been made in the embodiment regarding an arrangement in which the semiconductor light source 210 is provided on the high voltage side, and the constant current circuit 220 is configured as a current sink circuit. However, the present disclosure is not restricted to such an arrangement. That is to say, the circuit layout may be inverted, and the constant current circuit 220 may be configured as a current source circuit.

Description has been made regarding the present disclosure with reference to the embodiments using specific terms. However, the above-described embodiments show only the mechanisms and applications of the present disclosure. Rather, various modifications and various changes in the layout can be made without departing from the spirit and scope of the present disclosure defined in appended claims.

What is claimed is:

1. An automotive lamp comprising:
   an input terminal and a ground terminal;
   a semiconductor light source and a constant current circuit arranged in series between the input terminal and the ground terminal; and
   a load dump circuit structured to cut off or reduce a current that flows through the constant current circuit when an input voltage of the input terminal exceeds a predetermined threshold voltage,
   wherein the constant current circuit comprises:
   a first transistor and a limiting resistor arranged in series; and
   a bias circuit structured to adjust a voltage at a control terminal of the first transistor such that a voltage drop across the limiting resistor approaches a predetermined voltage,
   wherein the load dump circuit comprises:
   a second transistor arranged between the control terminal of the first transistor and the ground terminal; and
   a control circuit structured to turn on the second transistor when the input voltage exceeds the threshold voltage, and wherein the control circuit comprises:
   a first Zener diode having one end coupled to the input terminal;
   a first resistor arranged between an other end of the first Zener diode and a control terminal of the second transistor; and
   a second resistor arranged between the control terminal of the second transistor and the ground terminal.

2. The automotive lamp according to claim 1, further comprising a second Zener diode arranged between the input terminal and the ground terminal.

3. The automotive lamp according to claim 1, configured as an LED socket.

4. An automotive lamp comprising:
   an input terminal and a ground terminal;
   a semiconductor light source and a constant current circuit arranged in series between the input terminal and the ground terminal; and
   a load dump circuit structured to cut off or reduce a current that flows through the constant current circuit when an input voltage of the input terminal exceeds a predetermined threshold voltage,
   wherein the constant current circuit comprises:
   a first transistor and a limiting resistor arranged in series; and
   a bias circuit structured to adjust a voltage at a control terminal of the first transistor such that a voltage drop across the limiting resistor approaches a predetermined voltage, and
   wherein the bias circuit comprises:
   a bias transistor having an emitter grounded, a base coupled to a connection node that connects the first transistor and the limiting resistor, and a collector coupled to the control terminal of the first transistor; and
   a bias resistor arranged between the input terminal and the control terminal of the first transistor.

5. The automotive lamp according to claim 4, further comprising a second Zener diode arranged between the input terminal and the ground terminal.

6. The automotive lamp according to claim 4, configured as an LED socket.

7. An automotive lamp comprising:
   an input terminal and a ground terminal;
   a semiconductor light source and a constant current circuit arranged in series between the input terminal and the ground terminal; and
   a load dump circuit structured to cut off or reduce a current that flows through the constant current circuit when an input voltage of the input terminal exceeds a predetermined threshold voltage,
   wherein the constant current circuit comprises:
   a first transistor and a limiting resistor arranged in series; and
   a bias circuit structured to adjust a voltage at a control terminal of the first transistor such that a voltage drop across the limiting resistor approaches a predetermined voltage, and wherein the bias circuit comprises an error amplifier structured to receive a reference voltage and a voltage at a connection node that connects the first transistor and the limiting resistor, and having an output coupled to the control terminal of the first transistor.

8. The automotive lamp according to claim 7, further comprising a second Zener diode arranged between the input terminal and the ground terminal.

9. The automotive lamp according to claim 7, configured as an LED socket.

10. A lighting circuit structured to drive a plurality of light-emitting elements coupled in series, the lighting circuit comprising:
    a first constant current circuit arranged in series with the plurality of light-emitting elements between an input terminal and a ground terminal;

a second constant current circuit arranged in series with a part of the plurality of light-emitting elements between the input terminal and the ground terminal; and a control circuit structured to: (i) enable the first constant current circuit and disable the second constant current circuit when an input voltage of the input terminal is lower than a first threshold value; (ii) enable the first constant current circuit and disable the second constant current circuit when the input voltage is higher than the first threshold value and is lower than a second threshold value; and (iii) disable the first constant current circuit or reduce a current to be generated, and disable the second constant current circuit, when the input voltage is higher than the second threshold value.

11. The lighting circuit according to claim 10, further comprising:

a first input transistor arranged in series with the plurality of light-emitting elements and the first constant current circuit between the input terminal and the ground terminal; and a second input transistor arranged in series with the part of the plurality of light-emitting elements and the second constant current circuit between the input terminal and the ground terminal, wherein the first constant current circuit is controlled to be enabled or disabled according to an on/off state of the first input transistor, and wherein the second constant current circuit is controlled to be enabled or disabled according to an on/off state of the second input transistor.

12. The lighting circuit according to claim 10, wherein the first constant current circuit and the second constant current circuit are each provided with an enable terminal, and wherein the first constant current circuit and the second constant current circuit are each controlled to be enabled or disabled according to a state of the enable terminal thereof.

13. The lighting circuit according to claim 10, wherein the control circuit comprises a hysteresis comparator structured to compare the input voltage with a threshold voltage, and wherein the first constant current circuit and the second constant current circuit are each controlled to be enabled or disabled according to an output of the hysteresis comparator.

14. An automotive lamp comprising the lighting circuit according to claim 10.

* * * * *